US005747090A

United States Patent [19]

Menassa et al.

[11] Patent Number: 5,747,090
[45] Date of Patent: May 5, 1998

[54] UNDECYLENATE DEODORANTS FOR ANIMAL FEEDS

[75] Inventors: Aime Menassa, Paris; Henri Caupin, Versailles, both of France

[73] Assignees: Delta Agro Industries, Paris; Atochem, Puteaux, both of France

[21] Appl. No.: 13,537

[22] Filed: Jan. 28, 1993

Related U.S. Application Data

[63] Continuation of Ser. No. 902,484, Jun. 23, 1992, abandoned, which is a continuation of Ser. No. 629,848, Dec. 19, 1990, abandoned.

[30] Foreign Application Priority Data

Dec. 19, 1989 [FR] France .................................. 89 16794

[51] Int. Cl.⁶ ........................................................ A23L 3/34
[52] U.S. Cl. ........................ 426/532; 426/531; 426/534; 426/635; 426/641

[58] Field of Search .................................. 426/532, 635, 426/641, 531, 534

[56] References Cited

PUBLICATIONS

Hawly, The Condensed Chemical Dictionary, 10th Ed., 1981, Van Nostrand Reinhold Co.: New York, p. 1069.
Furia, Fenaroli's Handbook of Flavor Ingredients, 2nd Ed., vol. 2, 1975, CRC Press: Cleveland, Ohio, p. 195.
Arctander, Perfume and Flavor Chemicals, vol. II, 1965, Published by the Author: Monbelair, N.J., Monograph No. 3049.

*Primary Examiner*—Chhaya D. Sayala
*Attorney, Agent, or Firm*—Burns, Doane, Swecker & Mathis, L.L.P.

[57] ABSTRACT

Otherwise malodorous animal feeds are deodorized by treating same with an effective foodstuff deodorizing amount of polyoxyalkylene ester of undecylenic acid.

16 Claims, 1 Drawing Sheet

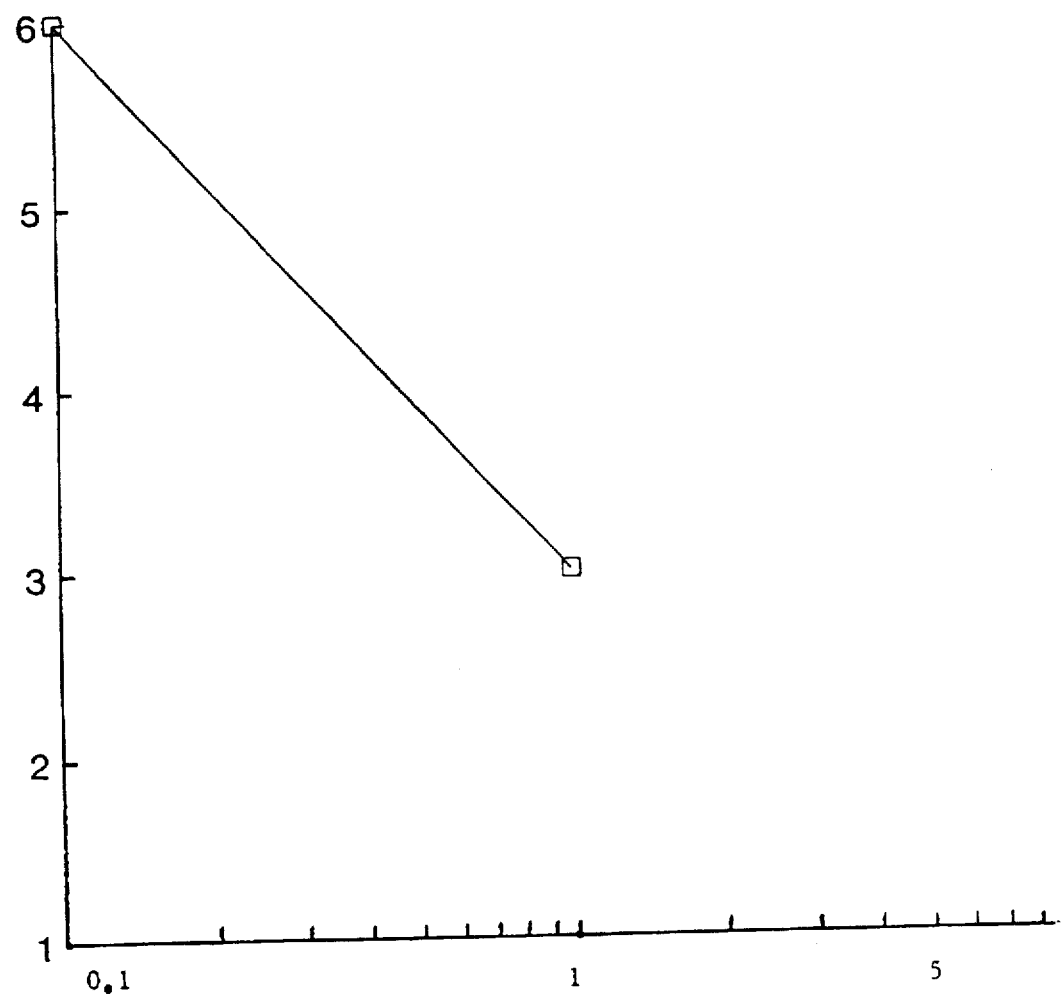

UNDECYLENATE DEODORANTS FOR ANIMAL FEEDS

This application is a continuation of application Ser. No. 07/902,484, filed Jun. 23, 1992, which is a continuation of application Ser. No. 07/629,848, filed Dec. 19, 1990, both abandoned.

CROSS-REFERENCE TO COMPANION APPLICATIONS

Copending applications Ser. No. 630181, U.S. Pat. No. 5,338,511 and Ser. No. 630183 now abandoned, both filed concurrently herewith and both assigned to the assignee hereof.

BACKGROUND OF THE INVENTION

1. Field of the Invention

The present invention relates to the deodorization of otherwise malodorous animal foodstuffs (or feeds), and, more especially, to the deodorization of such animal feeds by treating same with an effective deodorizing amount of an alkyl or polyoxyalkylene ester of undecylenic acid.

2. Description of the Prior Art

It is known to this art that, in the preparation of complex animal feeds, different raw materials are formulated to provide a variety of feeds having any one or more of a number of different nutritional feed specifications. However, the quality of a complex such foodstuff also depends on the physical properties of the various constituents thereof. These physical properties differ from one species to another and are also more or less fundamental.

Feed manufacturers resolve the odor problems of their products by aromatization (deodorization), a more or less systematic practice, depending on the particular type of feed.

Aromatization, or scenting, is frequently considered an unnecessary additional cost by feed manufacturers, which they tend to minimize. It is, however, indispensable for certain animals (piglets, for example), and also when the formulation includes auxiliary materials of a particular objectionable odor.

SUMMARY OF THE INVENTION

A major object of the present invention is the provision of novel animal feed compositions containing an effective deodorizing, or odor absorbing amount, of an alkyl or polyoxyalkylene ester of undecylenic acid.

DETAILED DESCRIPTION OF THE PREFERRED EMBODIMENTS OF THE INVENTION

More particularly according to the present invention, the preferred alkyl esters have from 1 to 12 carbon atoms in their ester moieties and the preferred polyoxyalkylene esters include the polyoxyethylene, polyoxypropylene and poly (oxyethylene)/(oxypropylene) esters of said undecylenic acid. Even more preferred are the methyl, propyl, hexyl and decyl undecylenates, as well as the polyoxyalkylene esters containing from 2 to 20 oxyalkylene recurring units.

The deodorants according to the invention may comprise a single such ester of undecylenic acid, or a mixture thereof, and such esters may be used neat or in the form of a solution or suspension thereof, or they may be adsorbed onto any suitable support.

In general, the undecylenic acid esters are effective as deodorants in very small concentrations, for example on the order of 0.1% to 5% by weight relative to the weight of the substrate to be deodorized.

The feed compositions of the present invention may also contain the typical additives and adjuvants, such as bacteriostatic or bactericidal agents, e.g., fungicides, as well as free undecylenic acid.

The deodorants of the invention may be incorporated into a wide variety of different animal feeds, notably those based on phosphates, polyphosphates or animal extracts and/or animal meals.

BRIEF DESCRIPTION OF THE FIGURE

The FIGURE of Drawing is a graph illustrating the effectiveness, for purposes of deodorization, of certain undecylenic acid esters according to the invention.

On the curve, the abscissa represents the amount of the undecylenic acid ester, in percent by weight, and the ordinate the degree of olfactory perception of the odor, with the values 1 to 6 respectively representing: none, very weak, weak, intermediate, strong and very strong.

This single curve reflects the results obtained with concentrated, mineral and vitamin reinforced HPB granules based on polyphosphates and animal meals, using the following esters: the methyl and polyoxyethylene esters of undecylenic acid having 8, 10 and 12 oxyethylene recurring units.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising (a) an animal foodstuff and (b) an effective foodstuff deodorizing amount of a polyoxyalkylene ester of undecylenic acid.

2. The composition of matter as defined by claim 1, wherein the polyoxyalkylene is selected from the group consisting of a polyoxyethylene, polyoxypropylene or poly (oxyethylene)/(oxypropylene).

3. The composition of matter as defined by claim 2, wherein the polyoxyalkylene comprises from 2 to 20 oxyalkylene recurring units.

4. The composition of matter as defined by claim 1, comprising from 0.1% to 5% by weight of said at least one ester of undecylenic acid.

5. The composition of matter as defined by claim 1, said animal foodstuff comprising a phosphate, polyphosphate, animal extract or animal meal.

6. The composition of matter as defined by claim 1, further comprising a bacteriostatic agent and/or free undecylenic acid.

7. The composition of matter as defined by claim 1, comprising a liquid solution or suspension of said ester of undecylenic acid.

8. The composition of matter as defined by claim 1, said ester of undecylenic acid being deposited onto a support therefor.

9. A process for deodorizing a malodorous animal feedstuff, comprising treating such feedstuff with an effective deodorizing amount of a poly-oxyalkylene ester of undecylenic acid.

10. The process of claim 9 wherein the malodorous foodstuff comprises a phosphate, polyphosphate, animal extract, or animal meal.

11. The process of claim 9, wherein said polyoxyalkylene is selected from the group consisting of a polyoxyethylene, polyoxypropylene or poly(oxylethylene)/(oxypropylene).

12. The process of claim 11 said ester comprise from 2 to 20 oxyalkylene recurring units.

13. The process of claim 9, wherein the foodstuff comprises from 0.1% to 5% by weight of said polyoxyalkylene ester of undecylenic acid.

14. The process of claim 9, wherein the foodstuff further comprises a bacteriostatic agent and/or free undecylenic acid.

15. The process of claim 9, wherein the foodstuff comprises a liquid solution or suspension of said ester of undecylenic acid.

16. The process of claim 9, wherein said at least one ester of undecylenic acid is deposited onto a support therefor.

* * * * *